United States Patent
Charney et al.

(10) Patent No.: US 7,386,104 B2
(45) Date of Patent: Jun. 10, 2008

(54) METHOD AND SYSTEM FOR TRANSFERRING DATA TO A LINE CONNECTED DEVICE USING A COMPUTER MODEM

(75) Inventors: Douglas Charney, Richmond (CA); Douglas Alvarado, Surrey (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 1029 days.

(21) Appl. No.: 10/401,728

(22) Filed: Mar. 31, 2003

(65) Prior Publication Data

US 2004/0131133 A1 Jul. 8, 2004

Related U.S. Application Data

(60) Provisional application No. 60/438,526, filed on Jan. 8, 2003.

(51) Int. Cl.
*H04M 11/00* (2006.01)
(52) U.S. Cl. .............. 379/93.09; 379/102.01; 379/102.02
(58) Field of Classification Search ............ 379/93.09, 379/90.01, 93.27, 93.26, 93.05, 93.28, 102.01, 379/102.02, 102.03, 355.06, 355.07; 455/418, 455/462
See application file for complete search history.

(56) References Cited

U.S. PATENT DOCUMENTS 5,414,751 A 5/1995 Yamada 6,233,323 B1 5/2001 Ali et al.
6,914,977 B2 * 7/2005 Danner et al. ......... 379/355.01

FOREIGN PATENT DOCUMENTS

| EP | 0 632 629 | 1/1995 |
| WO | WO 91/07839 | 5/1991 |

OTHER PUBLICATIONS

GB Search Report dated May 19, 2004.

* cited by examiner

*Primary Examiner*—Melur Ramakrishnaiah
(74) *Attorney, Agent, or Firm*—Paul Hastings Janofsky & Walker, LLP

(57) ABSTRACT

Systems and methods are described for providing connectivity to portable electronic devices, such as a cordless telephone, for the purpose of upgrading software features. In a preferred embodiment, portable electronic devices can receive incoming data at the PSTN jack from a personal computer that is also connected to the PSTN via a PSTN modem. In this manner, upgrades can be accomplished without requiring users to disconnect the telephone or to connect additional cables or components. The telephone is temporarily disabled from service only during the downloading of the upgrade software from the personal computer to the telephone. Upgrade software can be received at the personal computer from downloads or from other sources.

19 Claims, 8 Drawing Sheets

METHOD AND SYSTEM FOR TRANSFERRING DATA TO A LINE CONNECTED DEVICE USING A COMPUTER MODEM

This application claims the benefit of U.S. Provisional Patent Application Ser. No. 60/438,526 filed Jan. 8, 2003 and is incorporated herein by reference in its entirety.

BACKGROUND

1. Field of the Invention

The present invention relates generally to line connected devices, and more particularly to methods for transferring data to update features in a line connected device.

2. Background of the Invention

Modern cordless telephones are evolving to include many features in addition to standard functionality for placing telephone calls. For instance, cordless telephones are now becoming available that enable users to adjust ring tone and graphics displays, and otherwise personalize the interface of the telephone. Users can make selections from lists of options stored in telephone memory to customize the telephone to each respective user's preferences.

Since cordless telephones have a limited memory capacity, only a finite number of selections are usually made available to a user for customization. In any event, no matter how many different possible options are available for selection from the memory of a telephone, users may be interested in choosing from still more options of different tunes, designs, etc. Since many consumers may be willing to purchase different selections if they were made available, a market is created for software upgrades for cordless telephones. By producing electronic devices that are upgradeable, companies can foster consumer goodwill and loyalty while still maintaining or improving profit margins.

Unfortunately, once a digital device such as a cordless telephone is released into the consumer market, it becomes very difficult to upgrade or update the telephone with new software or firmware. One obvious method for upgrading a telephone is to manually disassemble the telephone and replace the processor or memory, or temporarily remove the memory from the telephone to add new software. Of course, this method is not practical for the vast majority of consumers, who are unlikely to have the skills necessary to perform such tasks.

Even if a portable electronic device can be especially designed to enable software updates, this might not be cost effective if the benefits from including this functionality are outweighed by the associated additional costs of design and manufacture. Adding functionality to an electronic device involves additional computer architecture design, software programming, parts and components, which may be incrementally expensive. Further, regardless of the development costs, consumers will not utilize such a feature unless the steps that are necessary to update the device are relatively uncomplicated and easy to be performed. Since many portable electronic devices, such as cellular or cordless telephones, have somewhat small GUI displays with limited interfaces, this can be particularly challenging. Finally, the additional components that are necessary to enable the device to be upgraded must not overwhelm the existing physical size of the device or the spacing of other components within the device. Since, for example, cellular and cordless telephones are designed to be lightweight and comfortably hand-held, the weight and size associated with every component is always an important design consideration.

Accordingly, there is a need for a method and system for transferring data to a cordless telephone to facilitate updating and upgrading the functionality of the device, and which is relatively easy to use and does not significantly contribute to the cost, size and weight of the device.

SUMMARY OF THE INVENTION

Systems and methods are described for providing connectivity to line connected devices, such as a cordless telephone, for the purpose of upgrading software features. In a preferred embodiment, portable electronic devices can receive incoming data at the PSTN jack from a personal computer that is also connected to the PSTN via a PSTN modem. In this manner, upgrades can be accomplished without requiring users to disconnect the device or to connect additional cables or components. The telephone may be temporarily disabled from service during the downloading of the upgrade software from the personal computer to the telephone. Upgrade software can be received at the personal computer from downloads or from other sources.

The line connected device can be communicatively connected to the computer modem in several different arrangements. In one embodiment, the device and computer modem are each connected to the PSTN line along with other telephone extensions within a home, such that all devices are in parallel. The modem and device can be configured to enable an on-hook or off-hook upgrading process.

In a second embodiment, the computer modem is connected to the PSTN through an additional pass-through line jack in the line connected device, such that the two devices are serially connected. The line connected device can isolate this connection from the rest of the PSTN to facilitate direct information transfer.

In a third embodiment, the line connected device is connected to the PSTN through an additional pass-through line jack in the computer modem, so that the two devices are serially connected in a different manner. In this embodiment, the modem can isolate the connection to the PSTN for directing information transfer.

In each of these embodiments, the line connected device may be any type of device that connects to a telephone line and is capable of being upgraded in programmable memory. This may include a cordless telephone system, a corded telephone, a facsimile machine, photocopier, answering machine, etc.

A method is disclosed for programming a line connected device. Encoded signals are received at a line interface of the device. The encoded signals that include device programming signals detected and routed to programmable memory in the device. The device programming signals are transmitted to the line interface during a programming mode, telephone signals or other encoded signals are transmitted to the line interface during an operation mode, and the device switches between programming and operation modes.

A method is also disclosed for programming information in a cordless telephone. FSK encoded signals received at a line jack are decoded in a decoder. The cordless telephone detects whether the FSK encoded signals include telephone programming signals, and if so, the programming signals are routed to programmable memory in the cordless telephone.

A programmable line connected device is also described, comprising a line interface for receiving encoded signals, a detector for detecting that the encoded signals include device programming signals, and a controller for routing programming signals to a programmable memory. Device programming signals are transmitted to the line interface during a programming mode, telephone signals or other encoded signals are transmitted to the line interface during an operation mode, and the device switches between programming and operation modes.

DETAILED DESCRIPTION OF THE PREFERRED EMBODIMENTS

Figure 1:
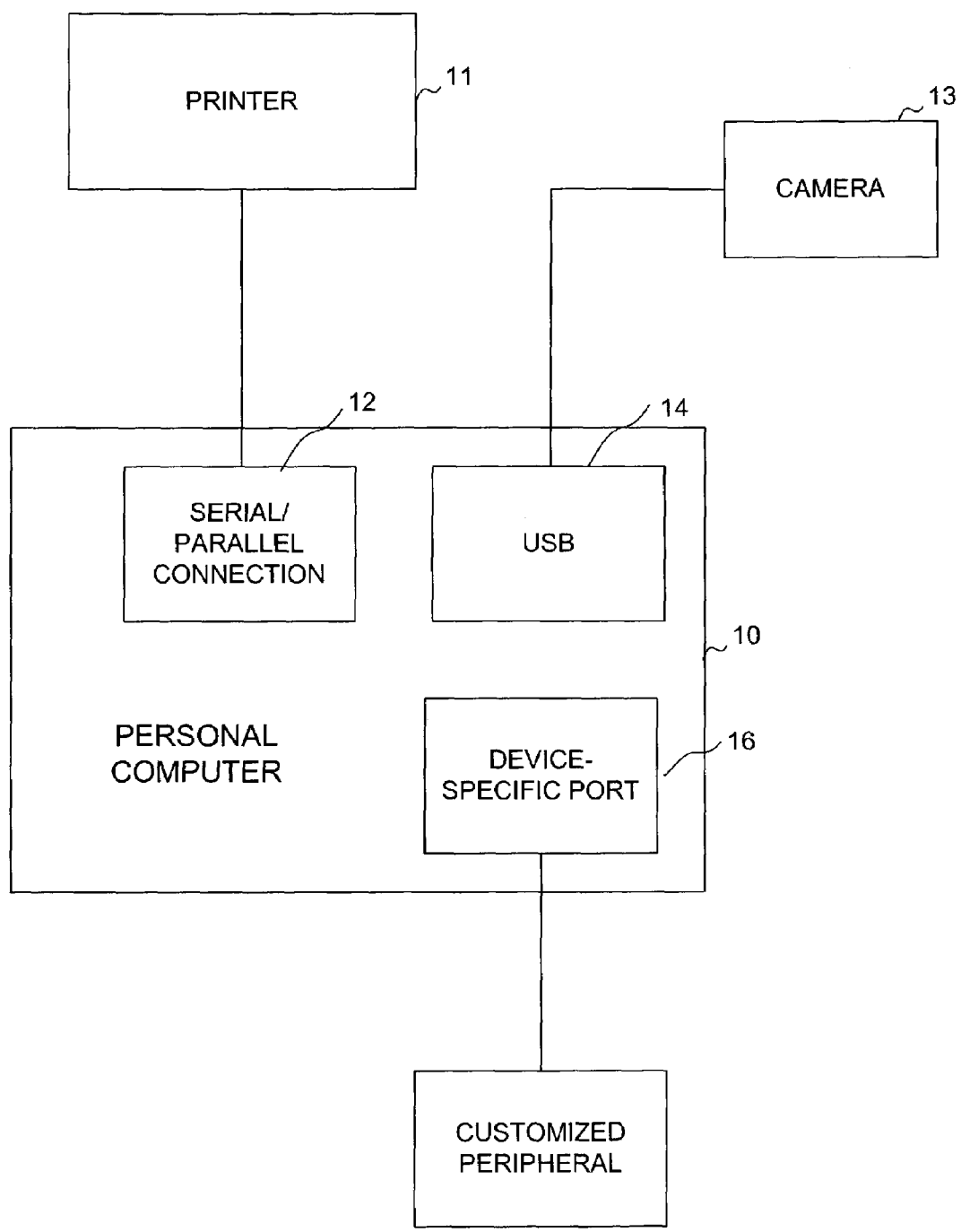
FIG. 1 is a schematic diagram of a conventional arrangement of a plurality of peripheral devices to a personal computer.

Data may be transmitted to electronic devices in several possible formats in accordance with a variety of different mechanisms. For instance, one method for communicating data to electronic devices or systems is via conventional peripheral ports on a personal computer or laptop computer, as shown in FIG. 1. As examples, a conventional printer 11 can be connected to a computer 10 via a serial/parallel connection 12 (utilizing an RS-232 cable), or a digital camera 13 may connect to a computer 10 via a USB port 14 (utilizing a USB cable). Instead of utilizing a conventional connection, it is also possible to connect a peripheral via a device-specific connection at a port 16 utilizing a device-specific protocol.

Figure 2:
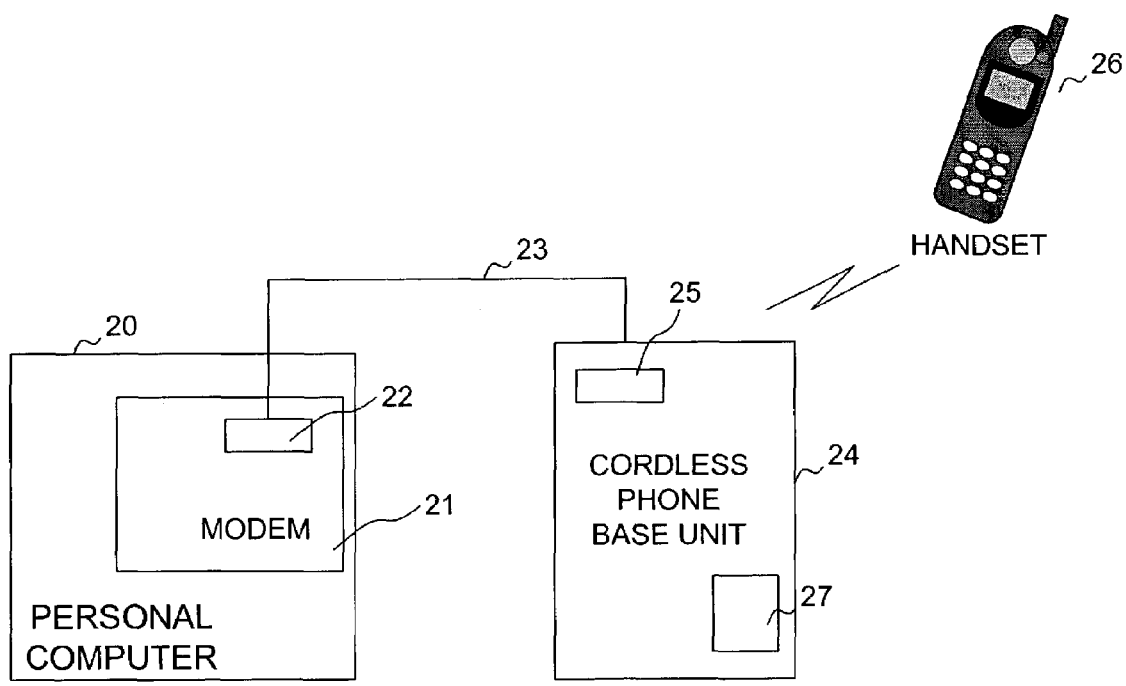
FIG. 2 is a schematic diagram of a connection of a personal computer to a base of a cordless telephone via a computer modem according to an embodiment of the present invention.

In addition to communicating data to or from such peripheral devices in the ordinary course of operation (e.g., sending information to be printed to printer 11, or sending pictures to be stored in memory from camera 13), it is possible to upgrade memory within the peripherals through these connections. As an embodiment of the present invention, FIG. 2 illustrates a connection of a cordless telephone to a personal computer or laptop computer to upgrade functionality of the telephone. As can be seen, the personal computer is directly connected to the base set of the cordless telephone via a telephone line and a computer modem within the personal computer.

It is particularly advantageous to upgrade a cordless telephone via the telephone line because the cordless telephone already includes a telephone input/output jack for its normal operation. Accordingly, it is not necessary to include an additional interface component solely for the purpose of enabling upgrades. Use of other such data interfaces, such as the serial/parallel connection or USB port of a personal computer, would require different hardware that contributes to the cost of the telephone.

There are several possible protocols by which a telephone controller can enable memory in the telephone to receive software updates. For example, an option may be presented in the graphical user interface (GUI) of the telephone for the user to temporarily operate the telephone in a "programming mode." This mode temporarily shuts down operation of the telephone so that the memory and associated processing will be allocated to receive upgrade information. As an alternative, the CPU may automatically switch the telephone into a programming mode once a signal is presented at the input port. Presence of a signal at the input port can then trigger a display at the GUI to notify the user of the status an upgrade in progress and when the upgrade is completed. However, if the upgrade will occur within only a few seconds and while the telephone is still on-hook, it may not be necessary to disable the telephone and provide status information at the GUI.

For performing upgrades according to at least one embodiment of the present invention, it is possible to use the existing processing capabilities already provided in a telephone. Particularly, modern cordless telephones and mobile cellular telephones typically include a digital signal processor (DSP) for decoding and processing control signals that are incident to the telephone from the PSTN through the advanced intelligent network (AIN). Modern telephones that are "caller-ID enabled" can decode a frequency-shift-key (FSK) encoded signal that is transmitted along with a ringing signal over the telephone network. The FSK encoded signal typically contains one or more packet headers that identifies the type of incoming data, and a payload perhaps containing a calling party name and telephone number. When this is decoded using an integrated DSP, the telephone forwards at least some of this information to the telephone display, and may also store at least the incoming telephone number in memory apportioned as a calling log. Therefore, a modern telephone already includes the necessary components and processing capability for receiving encoded signals and forwarding data to the telephone display and memory registers.

Returning to FIG. 2, it can be seen that personal computer 20 includes a computer modem 21, which can connect to a telephone line 23 via an output jack 22. The telephone line 23 is incoming to cordless telephone base unit 24 via telephone line input/output jack 25. The base unit of the cordless telephone assembly communicates with the handset 26 via an RF connection.

As described above, a modern cordless telephone that is caller-ID enabled will recognize an FSK-encoded caller ID signal incoming at line input/output jack 25 as a control signal at 1200 baud. In one embodiment for performing an upgrade function, the computer modem 21 can be configured to provide a similar FSK-encoded signal provided by personal computer 20. The FSK-encoded signal will include packet headers that indicate, instead of a caller-ID signal, an instruction that is recognized by the FSK-decoder 27 as an upgrade signal. Decoding this signal in FSK decoder 27 instructs the base unit to store the payload information as a memory upgrade.

Figure 3:
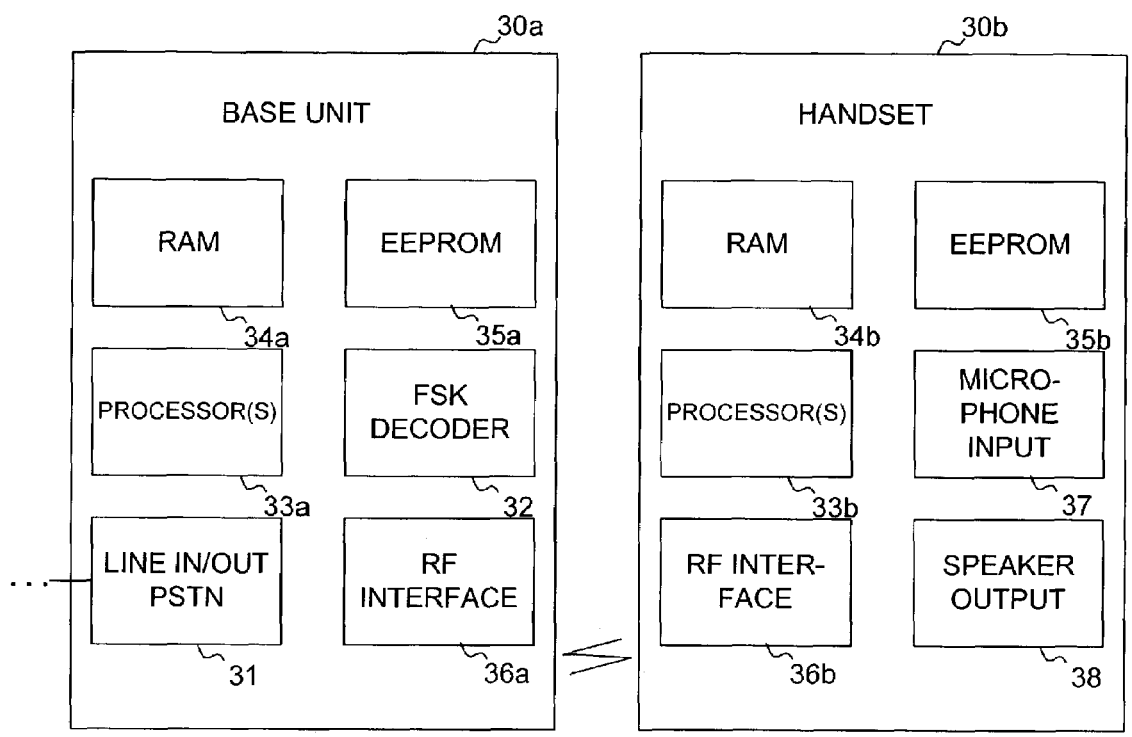
FIG. 3 is a schematic diagram of components within a base unit and a handset of a cordless telephone.

FIG. 3 illustrates the components within the base unit 30*a* and handset 30*b* of the cordless telephone system. The incoming upgrade information is received in the line in/out interface 31, where it is routed to FSK decoder 32. Control processor(s) 33*a* then route the decoded upgrade data to RAM 34*a*, EEPROM 35 or other memory within the base. Alternatively, the data is transcoded, modulated, and transmitted to the handset through an RF connection 36*a*, 36*b*, where it is decompressed, demodulated and routed to RAM 34*b*, EEPROM 35*b*, or other memory within the handset 30*b* at the direction of control processor(s) 33*b*. During the time of an upgrade, the handset bus disables microphone input 37 and other input from the handset (e.g., handset keys) as well as the speaker output 38.

Continuing with FIG. 2, in another embodiment, instead of providing an FSK-encoded signal to the telephone base unit, the modem 21 can operate in a conventional manner. That is, the modem will dial a telephone number, which will send a signal to the cordless base unit, and a modem (or a receive-only modem) within the cordless base will "pick up" the call and engage in data transfer between the devices. Advantages of this protocol are that (i) it enables higher bit-rate data transmission between the two units for transmitting more information, and (ii) it does not require modem 21 to perform in a manner that is different from its normal operation. However, additional modem-like processing capability is required at the telephone base unit to participate in modem communications with the personal computer 20.

Figure 4:
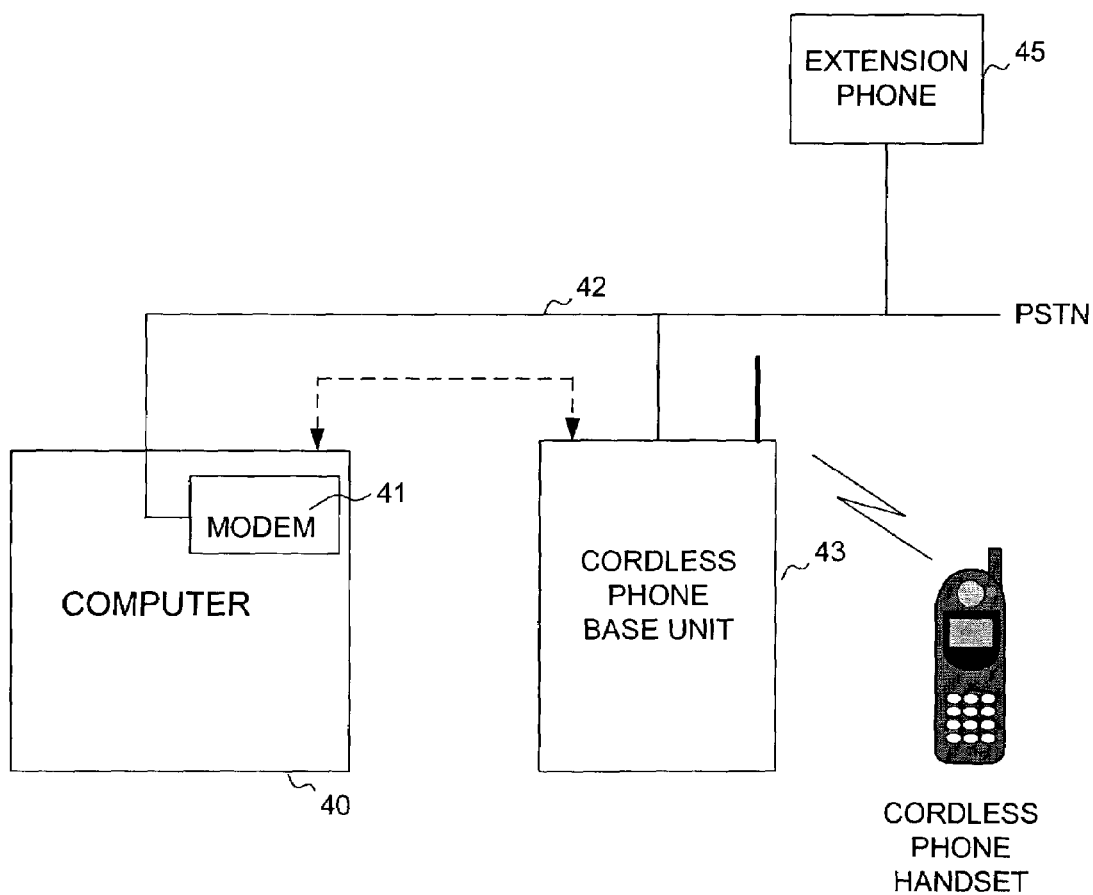
FIG. 4 is a schematic diagram of a parallel connection of a personal computer, a cordless telephone, and other telephones to a PSTN line within a home according to an embodiment of the present invention.

FIG. 4 is a schematic diagram illustrating a connection of a personal computer 40 and computer modem 41, a cordless telephone base 43, and an extension telephone 45, all to a PSTN line 42 within a home. As can be seen, each of these devices are connected in parallel. In normal operation, if any of these devices goes off-hook to connect to the PSTN (e.g., to initiate or receive a telephone call, or to initiate an on-line communication), the telephone line is "occupied" such that other extensions will not be able to initiate separate communications or receive telephone calls (other than sharing the line to participate in an existing conversation).

The cordless telephone system can be upgraded while connected in the configuration of FIG. 4 either while being on-hook or off-hook. For an on-hook connection, the other extension phone 45 will not be configured to receive the FSK-encoded signal, and so it will ignore temporary signaling that will occur in the line. Likewise, the temporary signaling will be ignored by the PSTN as the signal propagates out of the home.

As was described above, the upgrade can occur while the units are on-hook by sending an FSK-encoded signal from the modem. The signal is decoded in an FSK decoder in the controller of the base unit. The decoded signal is a stream of packets, and the header indicates the address for delivery of the payload. The payload contains the software for updating ring tones, graphics displays, etc.

As an alternative embodiment, the upgrade can also occur by temporarily placing the cordless telephone off-hook. In this manner, any extension telephones 45 will not be able to utilize the network during the upgrade operation. While the line is off-hook, a standard caller-ID transfer can be initiated by the modem 41, by sending a 1200 baud FSK signal in compliance with CID protocol. Once the information transfer is complete, the computer can then put the line back on-hook. The transmitted FSK signals will not be interpreted as a dialing command because they are comprised of a different tone set.

One problem that is associated with temporarily placing a cordless telephone off-hook is that a dial tone propagates through the line, which may interfere with the modem signals and FSK signals. One method to correct this is to use digital or analog filtering, built into the base unit, to filter out the tone. Another method is to adjust the amplitude or volume level of the modem tone to overpower the dial tone.

There are also methods to avoid the dial tone altogether. In one manner, a single DTMF digit is dialed, as if a call is being initiated. This will cause the line to become silent temporarily. During the temporary period, normal modem transfer of the FSK signal can be accomplished. As yet another method, a code can be transmitted from the telephone to the central office to request that the dial tone is temporarily disconnected.

Figure 5:
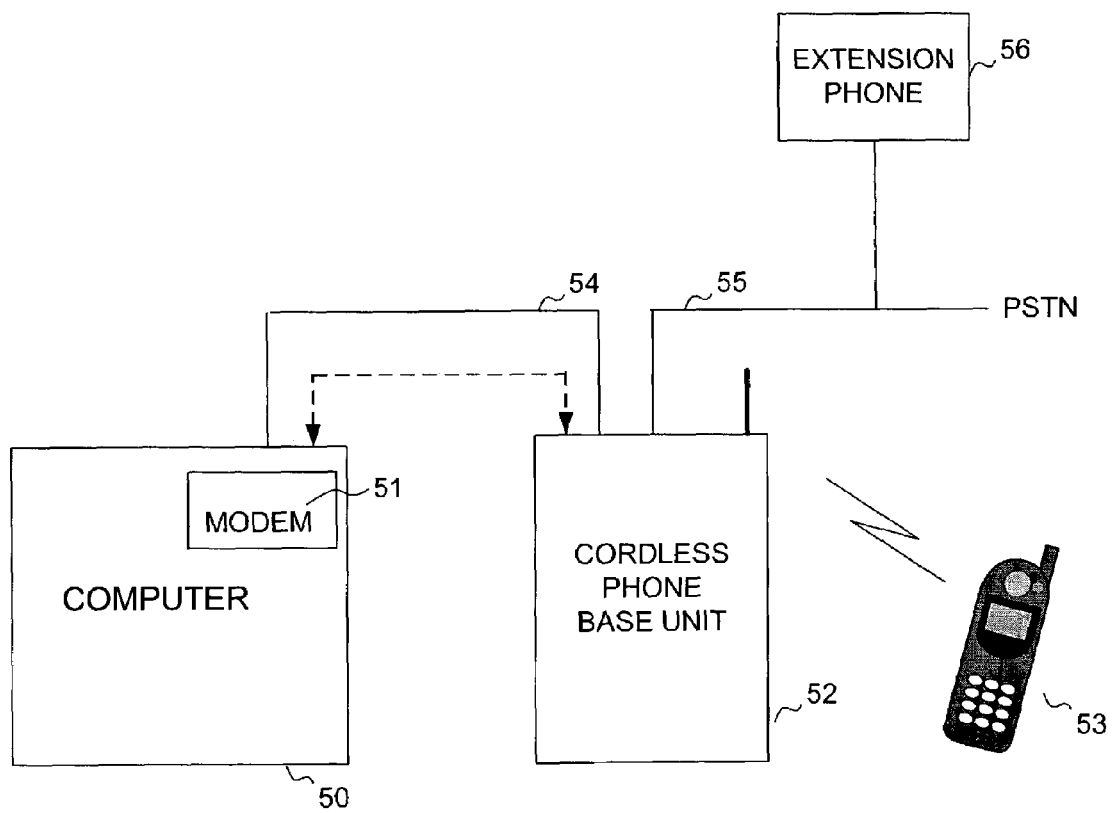
FIG. 5 is a schematic diagram of a computer modem connected to the PSTN through a pass-through line jack in a telephone, such that the two devices are serially connected according to an embodiment of the present invention.

FIG. 5 illustrates a different connection between the computer 50 and modem 51, cordless phone base unit 52, and PSTN line 55 as compared with FIG. 4. In FIG. 5, the cordless base unit 55 is connected to the PSTN 55 as in a conventional arrangement, but modem 51 is indirectly connected, as a "daisy chain," to the PSTN through line 54 connected between the modem and the base unit. The base unit includes two input/output jacks, one of which is a pass-through to connect the modem. The extension phone 56 is connected to PSTN in parallel with the cordless phone. The arrangement presented in FIG. 5 can be particularly useful if a consumer wishes to connect two devices to the PSTN but has only a single telephone outlet at a particular location.

In this arrangement, the computer 50 communicates directly to the cordless telephone, which can detect when the computer modem requests to provide a download. The cordless telephone can detect this because the auxiliary input jack (connected with line 54) would not otherwise receive FSK-encoded signals. In response, the cordless telephone base can then isolate this connection from the rest of the PSTN so that direct information transfer can take place. Alternatively, when the telephone is in an "regular operation" mode, the modem interface jack on the cordless telephone is a mere "pass through." However, when the telephone is switched to be in a programming mode, the modem interface jack on the cordless telephone is disconnected from the telephone line jack. In this manner, the modem will not initiate an outgoing call, and the telephone need not be placed off-hook.

Figure 6:
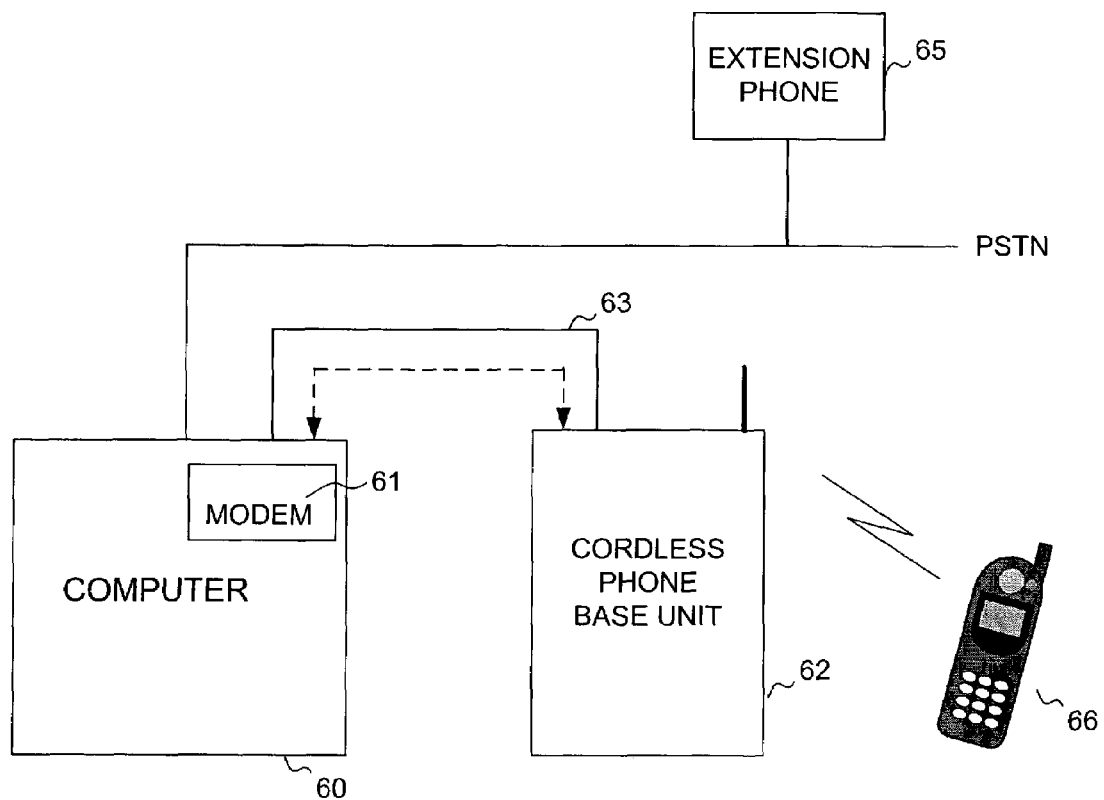
FIG. 6 is a schematic diagram of a telephone connected to the PSTN through a pass-through line jack in a computer modem, such that the two devices are serially connected according to an embodiment of the present invention.

FIG. 6 is similar to FIG. 5, except that in this embodiment it is the modem 61 that connects the cordless telephone base unit 62 to the PSTN 64. The cordless telephone base is "daisy-chained" via a dedicated line 63. The extension phone 65 is connected to the PSTN 64 in parallel with computer 60 and modem 61.

In this arrangement, an upgrade is still initiated by computer 60, which uses modem 61 to isolate the cordless base unit 62 from the network during the period of the upgrade. This can be done by special programming of a conventional modem, or through use of a specialized modem. From the perspective of the cordless telephone, the upgrade transaction occurs in the same manner as described with reference to FIG. 2. By including a switch in the modem that triggers between a "programmable" mode and "regular operations" mode, the modem can be configured to send signals only to the cordless telephone during programming, and not to the PSTN.

Figure 7:
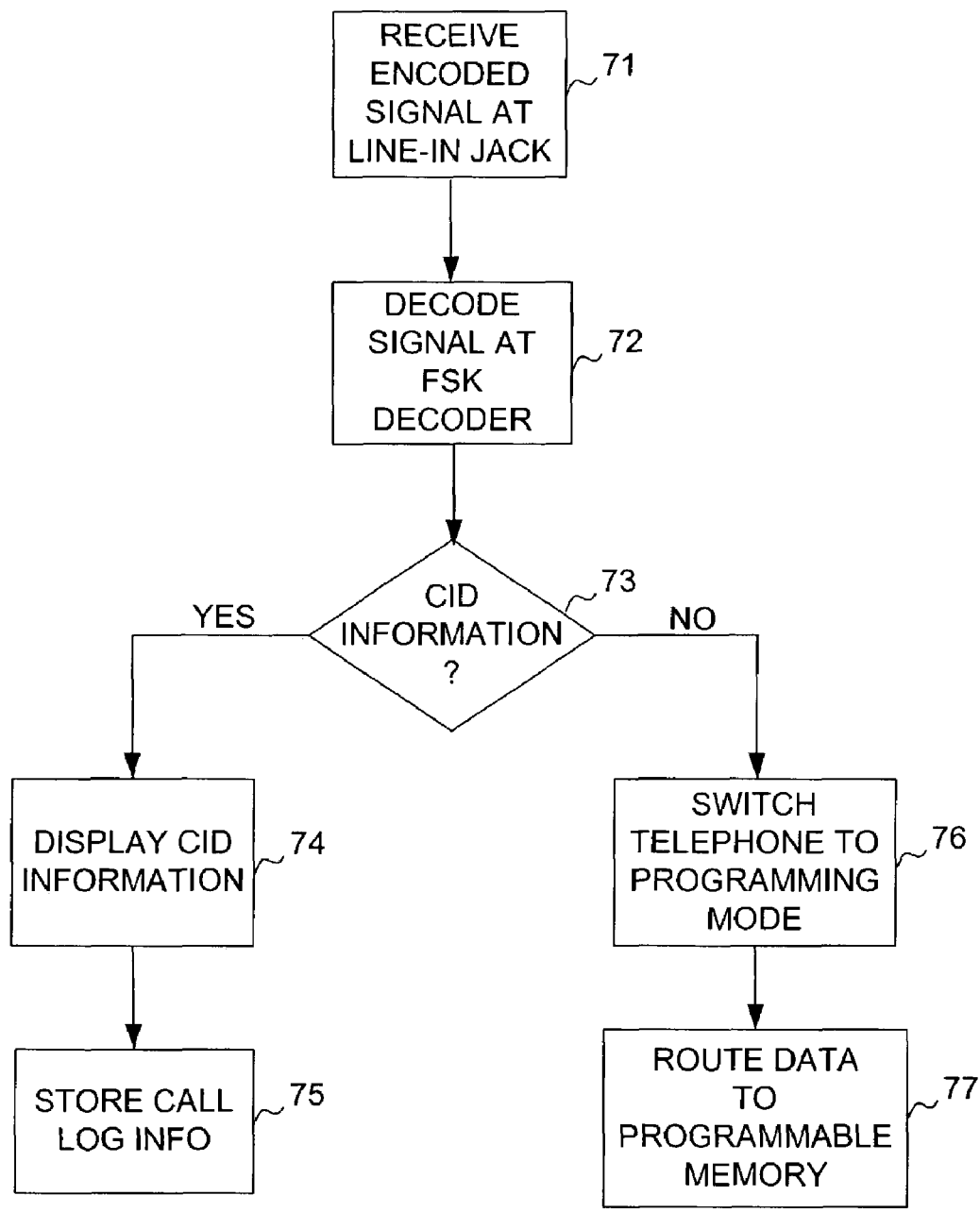
FIG. 7 is a flow diagram illustrating a method for programming a line connected device according to an embodiment of the present invention.

FIG. 7 is an exemplary flow diagram of a method for programming a line connected device in accordance with one or more embodiments of the present invention.

Once an encoded signal is received at the line_in jack in the base of the cordless phone in step 71, the signal is routed to the FSK decoder in the base controller and decoded, in step 72. If the encoded signal includes CID information (along with a ringing signal), as determined in step 73, the CID information is displayed on the graphical user interface in step 74 (which may be on the handset or base unit of the cordless telephone), and, depending the configuration of the cordless telephone, the CID information may be stored in a calling log, in step 75.

If it is determined that the decoded information is not CID information, then the telephone is switched to a programming mode in step 76, and the programming information is routed to programmable memory in step 77. Alternatively, a user can manually switch the telephone to a programming mode before the encoded signal is received. Optionally, a step may be included to place the telephone off-hook during the update.

Figure 8:
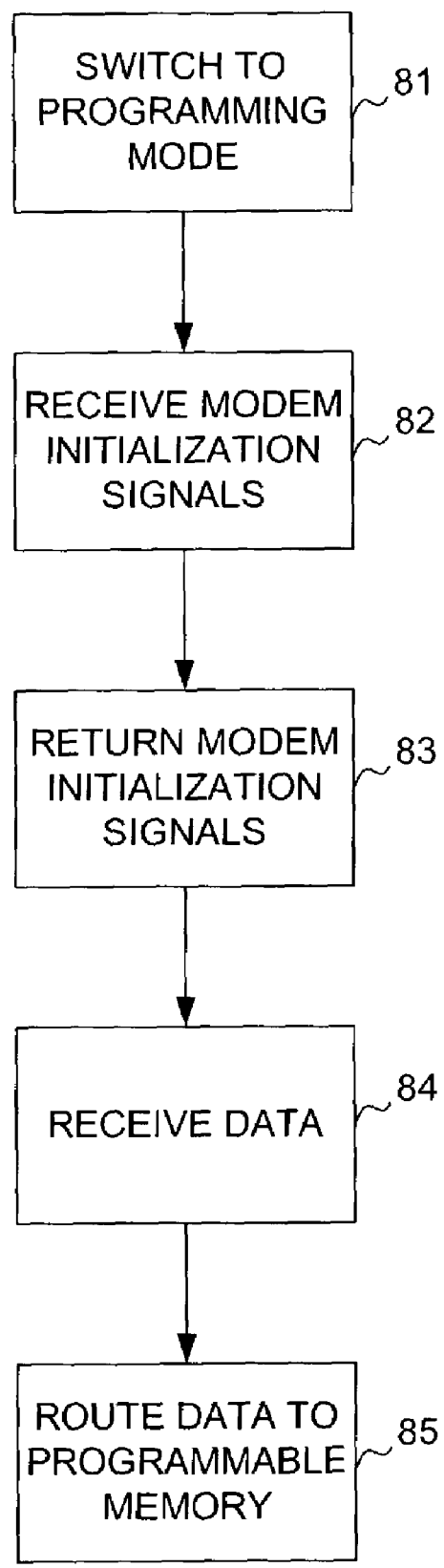
FIG. 8 is a flow diagram illustrating a method for programming a line connected device according to an alternative embodiment of the present invention.

FIG. 8 is an exemplary flow diagram of another method for programming a line connected device in accordance with one or more embodiments of the present invention.

In this embodiment, instead of specially configuring a modem to provide FSK-encoded signals to be decoded and interpreted by the FSK decoder in the controller of the cordless telephone, the input interface can be configured to receive standard modem signals. In FIG. 8, when a user desires to program the cordless telephone, the user sets the telephone to a programmable mode, using a predetermined code sequence or a prompt on the graphical user interface, in step 81. The user can initiates transmission of the program code through a personal computer. The cordless telephone will then receive modem initialization signals from the modem in step 82, and will return modem initialization signals via a standard modem communications protocol to initiate a communication, in step 83. It may be necessary to specially configure the cordless telephone to provide these initialization signals. The modem will then send payload data for receipt in the cordless telephone in step 84, which is then routed to programmable memory in the telephone in step 85. The payload data may be FSK encoded and decoded in the FSK decoder as described with reference to FIG. 7.

The examples described above illustrate how a line connected device can be upgraded using FSK encoded data and an FSK decoder. No particular modulation scheme is required, although it is advantageous to modulate the signal in accordance with the typical operation of the electronic device. The present invention is not intended to be limited to performing upgrades in a cordless telephone, instead, this method and system can be implemented in any telephone line connected electronic device having a DSP, and analog input and programmable storage. Examples of other such devices include corded telephones, facsimile machines, answering machines, and other computer modems.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for programming a line connected device, comprising:
   providing a direct connection between the line connected device and a computer via a connection line;
   receiving encoded signals sent from the computer over the direct connection at a line interface of the device;
   determining whether the encoded signals include device programming signals; and
   routing encoded signals determined to be programming signals to programmable memory in the device,
   wherein a programming mode is initiated when the encoded signals are determined to be programming signals, wherein telephone signals or other encoded signals are transmitted to the line interface during an operation mode, and wherein the device switches between programming and operation modes.

2. The method of claim 1, wherein the line connected device is a cordless telephone, and the encoded signals are transmitted by a computer modem connected to the cordless telephone via the connection line.

3. The method of claim 2, wherein the telephone places a PSTN line directly connected to at least one of the cordless telephone and the computer temporarily off-hook while device programming signals are received.

4. The method of claim 1, wherein the signals received at the line interface are FSK encoded, and the line connected device includes an FSK decoder.

5. The method of claim 1, wherein the line connected device automatically switches to the programming mode upon detecting programming signals at the line interface.

6. A method of programming information in a line connected device, comprising:
   providing a direct connection between the line connected device and a computer via a connection line;
   switching the line connected device to a programming mode, wherein the device can be switched between a programming mode and an operations mode, and wherein the switching to a programming mode takes place when encoded signals received at the line connected device are determined to be programming signals;
   receiving modem initialization signals at a line interface of the device from a modem of the computer connected over the connection line to the line connected device;
   outputting modem return signals at the line interface to initiate communications between the line connected device and the modem;
   receiving programming data from the modem; and
   routing received programming data to programmable memory in the line connected device.

7. The method of claim 6, wherein the line connected device is a cordless telephone.

8. A programmable line connected device, comprising:
   a line interface for receiving signals from a computer directly connected to the line connected device through a connection line;
   a detector for detecting that the signals include device programming signals, wherein a programming mode is initiated when the signals are determined to include device programming signals; and a controller for routing programming signals to a programmable memory;

wherein device programming signals are transmitted to the line interface during the programming mode, wherein telephone signals or other encoded signals are transmitted to the line interface during an operation mode, and wherein the device switches between programming and operation modes.

9. The line connected device of claim 8, wherein the line connected device is a cordless telephone, and the signals are transmitted by a computer modem connected to the telephone via the connection line.

10. The line connected device of claim 9, wherein the computer modem is connected to the telephone via a first line interface, and the telephone is connected to the PSTN via a second line interface.

11. The line connected device of claim 10, wherein the telephone is temporarily disconnected from the PSTN at the second line interface while device programming signals are received at the first line interface.

12. The line connected device of claim 9, wherein the signals received at the line interface are FSK encoded, and the line connected device includes an FSK decoder.

13. The line connected device of claim 9, wherein the cordless telephone is connected to the PSTN through a first connection and connected to the computer modem through a different connection, wherein the computer has no direct connection to the PSTN.

14. The line connected device of claim 9, wherein the computer modem is configured for transmitting programming signals without initiating a telephone call on the PSTN.

15. The line connected device according to claim 9, wherein the computer modem is directly connected to the cordless telephone, and the cordless telephone is configured to decode modem initialization and data transfer signals.

16. A method of programming information in a cordless telephone, comprising:

decoding FSK encoded signals received at a line jack in a cordless telephone from a computer directly connected to the cordless telephone over a connection line;

determining whether the decoded FSK signals contain telephone programming signals;

entering a programming mode if the decoded FSK signals are determined to contain programming signals; and routing the programming signals to programmable memory in the cordless telephone.

17. The method of claim 16, wherein the cordless telephone is connected to a computer modem for receiving telephone programming signals.

18. The method of claim 17, wherein the cordless telephone and computer modem are daisy chain connected to the PSTN.

19. The method according to claim 16, wherein the cordless telephone is configured to decode modem and return modem initialization signals in accordance with modem communications protocol.

* * * * *